June 13, 1933.    J. SQUIRES    1,913,733
PROPELLER
Filed Sept. 14, 1931    3 Sheets-Sheet 1
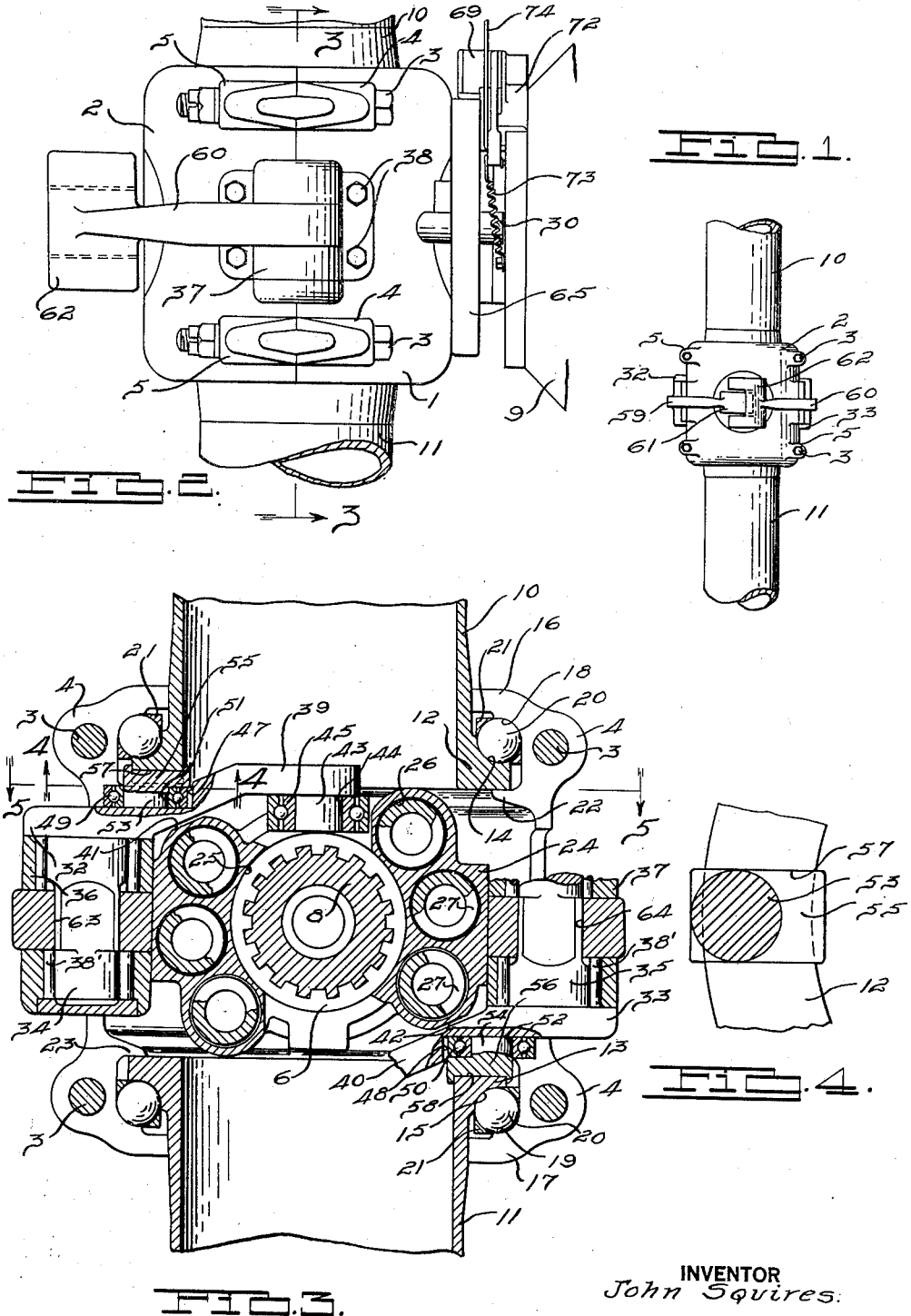

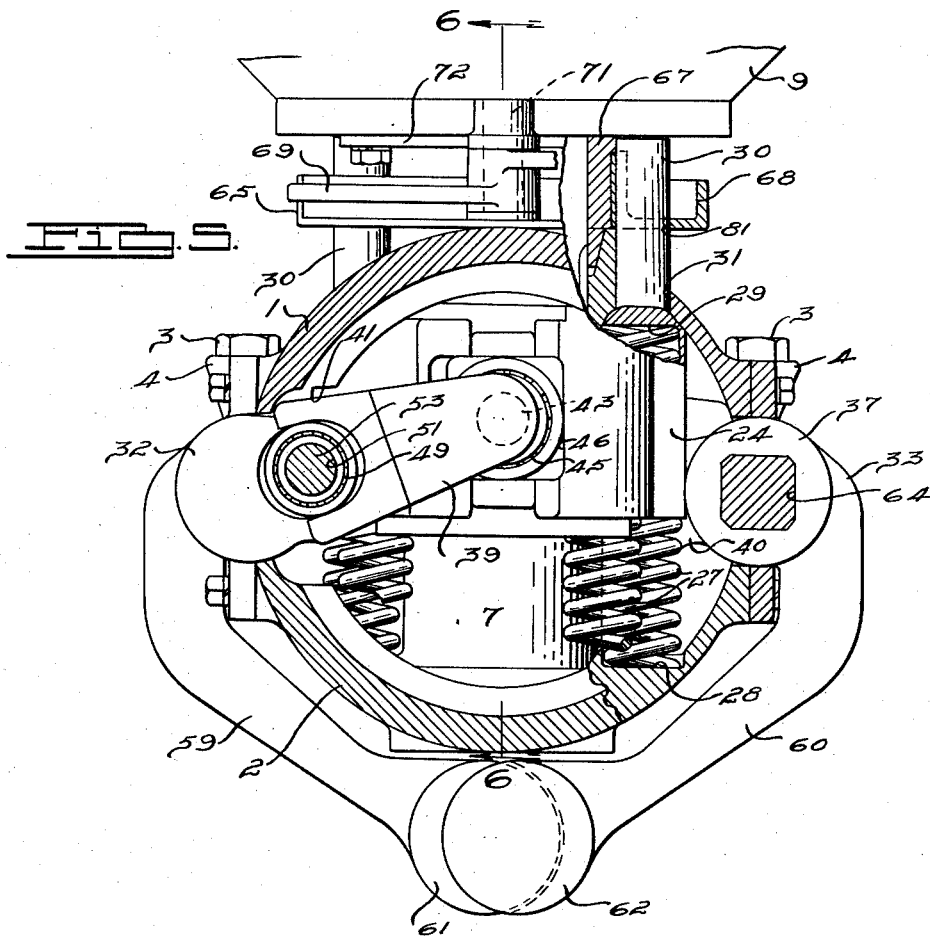
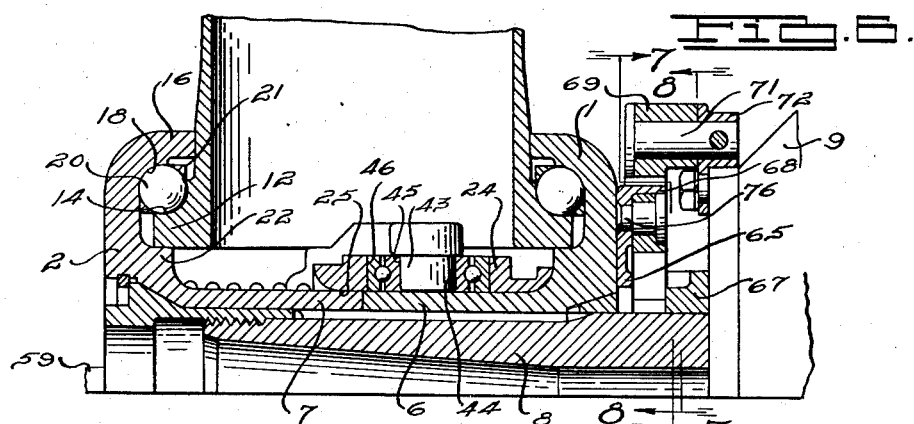

June 13, 1933.  J. SQUIRES  1,913,733
PROPELLER
Filed Sept. 14, 1931   3 Sheets-Sheet 3

INVENTOR
John Squires.
BY
Harness, Dickey, Pierce & Hann
ATTORNEYS.

Patented June 13, 1933

1,913,733

UNITED STATES PATENT OFFICE

JOHN SQUIRES, OF HAGERSTOWN, MARYLAND

PROPELLER

Application filed September 14, 1931. Serial No. 562,718.

This invention relates to an improved variable pitch propeller of the type which is self-adjustable during operation.

The main objects of the invention are to provide a propeller of this character which is automatically conditioned during rotation to maintain substantially full power of the engine by which it is driven during rotation of the propeller at a comparatively uniform speed; to provide means for yieldably holding the blades of the propeller in low pitch positions while an aircraft is gaining in forward movement or ascending; to provide means of this kind which is adapted to oppose increasing of the pitch of the blades until the engine closely approaches its normal rated speed; to provide mechanism which is responsive to the speed of rotation of the propeller and which is calibrated to increase the pitch of the blades from their minimum pitch positions to their maximum pitch positions within a very small difference of speed of rotation of the propeller at a predetermined speed of the engine; to provide blade governing mechanism of this kind which rapidly builds up the load on the propeller and engine by increasing the pitch of the blades so as to compensate for the load decreasing influence of forward movement of the aircraft when the propeller tends to exceed a predetermined speed of rotation; and to provide mechanism of this kind which also rapidly compensates, by decreasing the pitch of the blades, for the increase in the torque load on the propeller and engine which occurs in accelerating the forward movement of the aircraft.

During some conditions of flight, such as cruising, it is advantageous to lock the self-adjustable blades of propellers of this character in their cruising pitch positions.

This operation requires locking apparatus which is capable of withstanding a tremendous load in resisting the action of the resilient means by which the blades are normally urged toward minimum pitch positions. Numerous difficulties are encountered in manually deriving the force necessary to hold the blades against turning, from mechanism which is supported by the nose, or other stationary structure of an aircraft with which the propeller is associated. Still more perplexing problems arise in transmitting the required force to the rotating propeller structure.

Further objects of the invention are to provide an adjustable propeller of this character which has self-contained locking apparatus that is adapted to hold the blades in their cruising pitch positions independently of the stationary nose structure of an aircraft; to provide locking apparatus of this kind which is adapted to be applied and released mainly by force derived by the rotation of the propeller and which requires the application of only an initial manually derived force of low amplitude in order to lock the blades in their cruising pitch positions; and to provide manual control means on the nose structure which coacts frictionally with a rotating element of the propeller in applying the initiating force for the locking and unlocking operations of the locking apparatus.

An illustrative embodiment of the invention is shown in the accompanying drawings, in which—

Fig. 1 is a front elevation of a propeller which embodies my invention.

Fig. 2 is a fragmentary side elevation of the propeller shown in Fig. 1, illustrating the hub structure thereof in detail.

Fig. 3 is a vertical section taken on the line 3—3 of Fig. 2.

Fig. 4 is a fragmentary horizontal section taken on the line 4—4 of Fig. 3.

Fig. 5 is a horizontal section taken on the line 5—5 of Fig. 3.

Fig. 6 is a central vertical section taken on the line 6—6 of Fig. 5.

Figure 7:
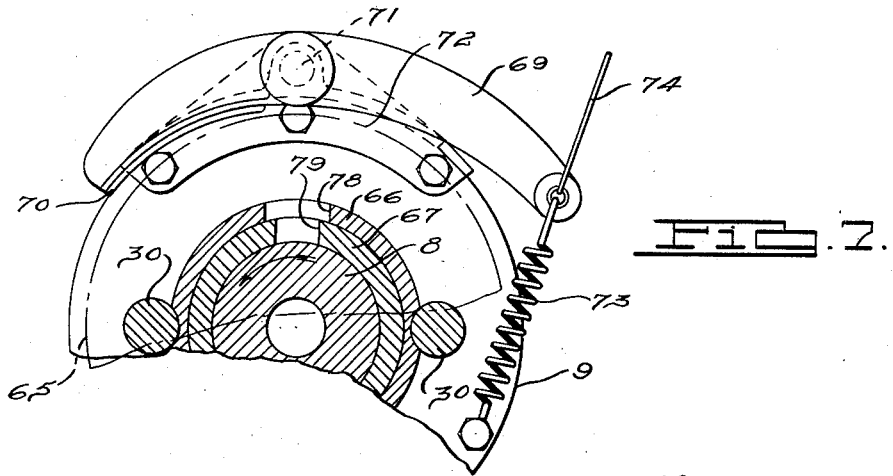
Fig. 7 is a vertical section taken on the line 7—7 of Fig. 6.

In the form shown, my improved propeller has a hub portion which includes a pair of complementary sections 1 and 2 that are firmly clamped together with their edges in abutting relationship by bolts 3 which extend through apertured bosses 4 and 5 on the hub sections 1 and 2, respectively. Integrally formed on the hub sections 1 and 2 are hub bosses 6 and 7 which extend inwardly and form a sleeve for receiving a propeller shaft 8 that extends outwardly from a nose structure 9 of the engine of an aircraft.

The respectively opposite ends of the propeller hub are open for receiving rotatably adjustable propeller blades 10 and 11 which have radially extending flanges 12 and 13 at their root end portions in which are formed ball bearing receiving grooves 14 and 15. The open ends of the hub are restricted by inwardly extending flanges 16 and 17 in which are formed ball bearing receiving grooves 18 and 19 that are opposite the grooves 14 and 15. A plurality of ball bearings 20 are seated in the grooves of the hub structure and flange 12 and held in spaced relation by retaining rings 21. The blades 10 and 11 are held against inward movement relative to the hub structure by inwardly extending flanges 22 and 23. The inner extremities of the blades seat upon the flanges 22 and 23 when the propeller is at rest but when the propeller is rotated during operation the extremities of the blades are held out of contact with the flanges 22 and 23 by the centrifugal action upon the blades. The clearance allowed between the inner flanges 22 and 23 and the extremities of the blades and the clearance between the peripheries of the flanges 12 and 13 of the blades and the interior of the hub structure permits the blades to be held against outward movement during operation of the propeller solely by the ball bearings 20 which permit free rotation of the blades relative to the hub.

The rotatable blades 10 and 11 are normally urged toward their minimum pitch positions by mechanism which has a synchronizing member 24 that is slidably mounted on the outer periphery of the aligned hub bosses 6 and 7 and adapted to hold the blades at the same pitch. This synchronizing member includes a ring-shaped structure of substantial thickness having a central opening 25 for receiving the aligned hub bosses and it is provided with spaced sockets 26 in which coil springs 27 are disposed. The coil springs 27 bear between seats 28 formed on the hub section 2, and the inner extremities 29 of the sockets 26 so as to yieldably hold the synchronizing member 24 against the side of the propeller hub which is adjacent the nose structure of the aircraft. Integrally formed on the synchronizing member 24 are protruding pins 30 which extend through apertures 31 in the hub section 1 in the direction of the nose structure 9.

The synchronizing member 24 is positively connected with the propeller blades 10 and 11 by crank elements 32 and 33, respectively, which have journal portions 34 and 35 pivotally mounted in brackets 36 and 37 that are secured to respectively opposite sides of the hub by bolts 38. The journal portions 34 and 35 are rotatably supported by roller bearings 38' located between the peripheries of the journaled portions and the inner peripheries of the passages of the brackets into which the journaled portions extend. The cranks 32 and 33 have arms 39 and 40 which extend into the interior of the hub through slots 41 and 42 in the side wall thereof. Each inwardly extending arm is provided with a boss 43 which is received in a passage 44 of a ball race 45 that is slidably mounted in an aperture 46 in the synchronizing member 24 so as to serve as a cross head. The bosses 43 are located on diametrically opposite sides of the synchronizing member so that movement of the latter in one direction rotates the crank members in respectively opposite directions. Formed in the intermediate portions of the arms 39 and 40, between the journaled parts of the cranks and the internal bosses of the arms, are recesses 47 and 48 in which ball races 49 and 50 are seated. The ball races 49 and 50 have central passages 51 and 52 in which bosses 53 and 54, respectively, of blocks 55 and 56 are received. The blocks 55 and 56 are seated in recesses 57 and 58 formed in the flanges 12 and 13 of the blades 10 and 11, respectively. By means of this structure the blades 10 and 11 are retained at exactly the same pitch and normally springs 27 yieldably hold them in their minimum pitch positions.

In order to increase the pitch of the blades it is necessary for the synchronizing member 24 to be shifted outwardly with respect to the nose structure 9 of the aircraft. The synchronizing member 24 is shifted against the action of the springs by means which are responsive to the speed of rotation of the propeller and which include a pair of centrifugal arms 59 and 60 having outer weighted end portions 61 and 62, respectively. The inner ends of the arms 59 and 60 have rectangular apertures 63 and 64 in which are received intermediate rectangular sections of the journal parts 34 and 35 of the cranks 32 and 33, respectively. As the centrifugal arm 59 is swung outwardly during rotation of the propeller it turns the crank 32 in a clockwise direction, as viewed in Fig. 5, so as to rotate the upper propeller blade in a counter-clockwise direction toward increased pitch positions. Outward swinging of the other centrifugal arm 60 turns the crank 33 in a counter-clockwise direction so as to rotate the lower blade 11 in a clockwise direction toward increased pitch position.

Before the centrifugal governing means can increase the pitch of the blades it is required to overcome the forces of the springs and the pitch reducing influence which is exerted on the blade by the resultant force of the centrifugal moments, and the aerodynamic moments developed by the wind pressure to which the blades are subjected. The centrifugal arms 59 and 60 are preferably designed so as to develop sufficient force to balance the pitch reducing resultant of the centrifugal and aerodynamic moments acting upon the blades and to substantially balance the initial compressive forces of the springs when the propeller is driven by an engine operated at its rated speed and full load and while the aircraft is at rest on the ground. Under these conditions the blades are held at their minimum pitch positions, for instance ten degrees, by the residual force in the springs which under such conditions will be quickly overcome by the centrifugal weights upon a slight increase in engine speed as will occur upon forward movement of the aircraft.

The springs 27 are preferably placed under an initial compression of sufficient amplitude to retain the blades in their minimum pitch position until the speed of the propeller very closely approaches the speed at which the engine develops maximum power, 2125 R. P. M. for example. As the aircraft gains in forward movement, the propeller torque is decreased and it tends to rotate at a faster rate causing the centrifugal governing arms to swing outwardly beyond the position at which they merely balance the pitch reducing influence normally acting upon the blades during rotation. This movement of the arms occurs within a small range of increase in the propeller speed above the speed at which full power is developed by the engine and shifts the synchronizing member outwardly against the action of the springs 27 so as to rotate the cranks 32 and 33 which turn the blades 10 and 11 to increased pitch positions. The increased pitch of the blades augments the load on the propeller and in this manner maintains the engine operation at full torque and substantially uniform speed which is high desirable during take-off, ascent from one elevation to another and during cruising under some conditions. It is obvious that the blade governing mechanism can be constructed so as to vary the pitch of the blades over whatever range is desirable to utilize the full rated speed and power of the engine from take-off of the aircraft to maximum possible speed of flight.

During cruising flight of an aircraft it is sometimes highly desirable to retain the blades at given pitch positions irrespective of the operating speed of the propeller. My improved propeller is provided with locking mechanism which is contained solely by the propeller and which is adapted to be manually applied for securing the blades against decreasing in pitch from their cruising pitch position by control apparatus that is supported independently of the propeller on the adjacent nose structure of the aircraft. The control apparatus is normally disengaged from the locking mechanism and is merely required to exert an initial force thereon of low amplitude for the main portion of the energy required in operating the locking mechanism is derived from rotation of the propeller. The locking apparatus is automatically releasable by centrifugal means which are operative during certain flight conditions of the aircraft.

Figure 8:
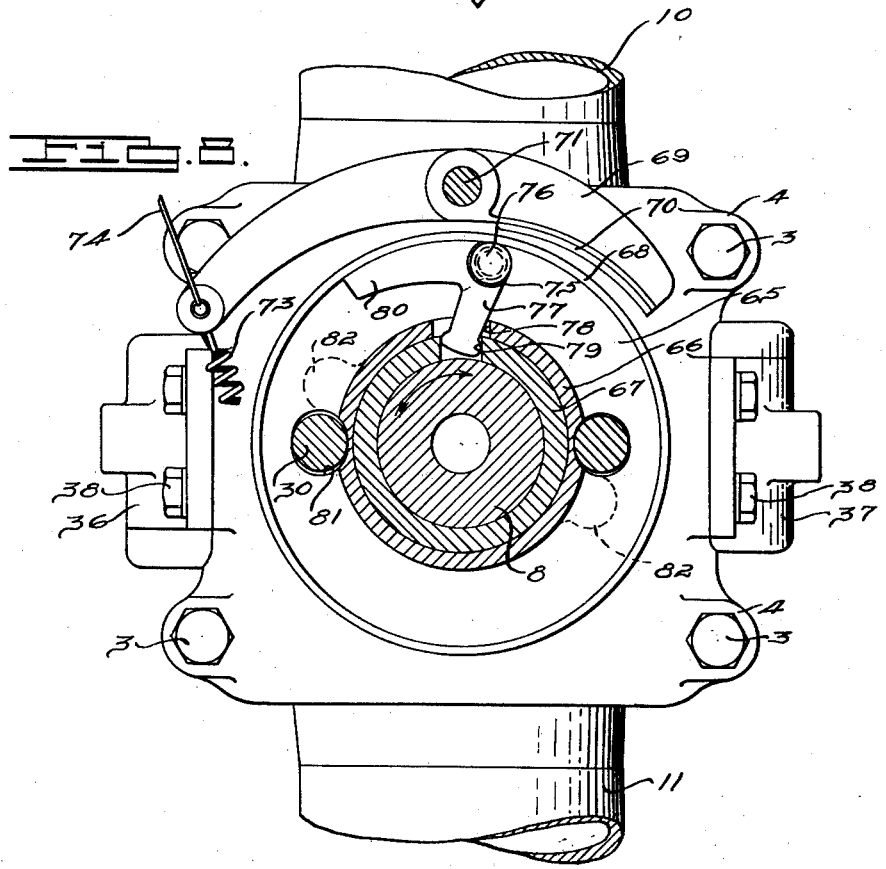
Fig. 8 is a vertical section taken on the line 8—8 of Fig. 6.

In the illustration shown the locking mechanism includes a drum 65 having a hub portion 66 which is journaled on a collar 67 fixed on the propeller shaft 8. The drum 65 has an outer peripheral portion 68 with which a brake shoe 69 having brake lining 70 is adapted to frictionally coact. The brake shoe 69 is pivotally mounted on a pin 71 which is secured to the nose structure 9 by a bracket 72 and it is normally held in a retracted position by a coil spring 73. Secured to the left extremity of the brake shoe, as viewed in Fig. 8, is a cable 74 which preferably extends to a position within convenient reach of the operator of the aircraft. Rotation of the drum 65 relative to the propeller shaft 8 and collar 67 is limited by a bell crank lever 75 which is pivotally mounted at 76 on the end wall of the drum or other suitable means coacting either positively or yieldably between the drum and the shaft 8 or collar 67. The lever 75 has a downwardly extending arm 77 which passes through an aperture 78 in the hub portion 66 of the drum and which is received in a slot 79 formed in the collar 67. The other arm 80 of the bell crank lever has an upper edge which conforms to the curvature of the inner periphery of the drum 65 and which is of sufficient weight to rotate the drum in a clockwise direction relative to the propeller shaft by the centrifugal force acting on the weighted arm during rotation of the propeller.

Formed in the end wall of the drum 65 are apertures 81 for receiving the pins 30 of the synchronizing member 24. The bell crank lever 75 normally holds the drum in the position shown in Fig. 8 so as to retain the apertures 81 in registration with the pins 30 but when the pins are withdrawn from the apertures 81 by the movement of the synchronizing member 24 to the position required to place the blades in their maximum pitch positions, the drum may be rotated against the centrifugal action of the bell crank lever by retarding the rotation of the drum with the aid of the brake shoe 69 so as to move the apertures 81 out of registration with the pins 30 and to bring the bosses 82 on the end wall of the drum into alignment with the pins. The bosses 82 hold the pins and synchronizing member against movement toward the nose structure 9, thereby maintaining the blades in their cruising pitch positions.

In operation, the centrifugal arms 59 and 60 balance the forces normally acting upon the blades which tend to turn them toward zero pitch positions, when the propeller driving engine is operated at full speed while the aircraft is at rest. When the load on the propeller is decreased sufficiently by forward movement of the aircraft to allow the propeller to exceed the normal full power operating speed of the engine, the centrifugal arms 59 and 60 turn the blades from their minimum pitch positions to their maximum pitch positions against the forces of the springs 27 which act through the synchronizing member 24. The centrifugal force exerted by the weighted arms greatly exceeds that required to turn the blades against the action of the springs and the forces normally acting upon the blades and urging them toward their minimum pitch positions. In this manner regulation of the pitch of the blades by a slight variation in the speed of the propeller is attained, the operation of the engine is maintained at its full load developing speed during varying speeds of forward movement of the aircraft. The governing apparatus is preferably designed to maintain the blades in their maximum pitch positions by rotation of the propeller at a relatively small increase, for example 25 R. P. M., beyond the rated speed of the engine. This range may be increased to, for instance, 200 R. P. M. without particular disadvantage. Such a slight increase in the speed of the operation of the engine would not materially effect the power output thereof but it is sufficient to cause the blade governing mechanism to develop a substantial excess force. The pitch angle increases to accommodate the higher aircraft velocity at constant revolution speed, and thereby withdraws pins 30 from aperture 81.

The cruising pitch of the blades is preferably slightly less than their maximum pitch and cruising pitch positions, the speed of the engine is preferably increased while the operator pulls upon the cord 74. Diving of the aircraft removes a substantial portion of the load from the propeller and permits it to rotate at an unusually fast rate substantially above the normal speed. The increased speed of the propeller causes the centrifugal arms 59 and 60 to swing outwardly the centrifugal arms which move the synchronizing member outwardly far enough to completely withdraw the pins 30 from the apertures 81 of the drum 65. When the pins are removed from the apertures 81 while the brake is being applied, rotation of the drum is momentarily retarded so that the drum in effect is turned in a counter-clockwise direction relative to the pins, as viewed in Fig. 8. This rotation of the drum moves the apertures 81 out of registration with the pins and brings the bosses 82 into alignment therewith. When the aircraft is again righted the pitch tends to reduce with the aircraft speed and the springs urge the synchronizing member toward the nose structure and force the extremities of the pins against the bosses 82 with tremendous pressure. Movement of the synchronizing member toward the nose structure is positively arrested by the bosses and since the blades are rigidly connected with the synchronizing member by the cranks 32 and 33, the blades are also positively locked against movement toward zero pitch positions.

When the cruising pitch is very close to the maximum pitch complete withdrawal of the pins 30 from the apertures 81 may be effected by putting the aircraft into a dive so as to remove a substantial portion of the load on the propeller and to allow the latter to rotate temporarily at an unusually high speed. When this is done while the cord 74 is being pulled the above locking action takes place even though the cruising pitch is substantially as high as the maximum pitch.

The locking mechanism is automatically released when the speed of the engine is increased above the cruising speed without application of the brake 69. When desired an increase in speed sufficient to unlock the locking mechanism may be obtained by bringing the aircraft into a temporary dive. Such operations increase the pitch of the propeller above its cruising value and remove the extremities of the pins 30 from engagement with the bosses 82. As soon as the pins are moved out of contact with the bosses, centrifugal action upon the weighted arm 80 of the bell crank lever 75 rotates the latter in a clockwise direction causing the other arm 77 which bears at its end against the sides of the slot 79 to turn the drum in a clockwise direction, thereby bringing the apertures 81 back into registration with the pins. Thereafter the pins are free to extend through the apertures 81 permitting control of the pitch of the blades by the blade governing mechanism in the above described manner.

I claim:

1. A propeller including adjustable blades, means for proportioning the pitch of said blades with respect to the speed of rotation of said propeller above a predetermined speed, locking mechanism for holding said blades against decreasing below a predetermined pitch position including means for preventing the application of said locking mechanism during all speeds below said predetermined operating speed, said locking mechanism being adapted to be motivated by the rotation of said propeller, and manual control apparatus for selectively applying said locking mechanism during operation of said propeller substantially at said predetermined speed.

2. A propeller including adjustable blades, means responsive to rotation of said blades for varying the pitch of said blades, releasable locking mechanism for holding said blades against decreasing from a predetermined pitch position, and means responsive to rotation of said propeller and operative when the rotated speed thereof is increased for releasing said locking mechanism when said predetermined pitch is exceeded by operation of said propeller above said predetermined speed.

3. A propeller including adjustable blades, means responsive to rotation of said propeller for varying the pitch of said blades, locking mechanism for selectively holding said blades against decreasing from a predetermined pitch during rotation of said propeller below a predetermined speed, centrifugally operable means for releasing said locking mechanism when the pitch of said blades is increased above said predetermined pitch by operation of said propeller above said predetermined speed, and manual control apparatus for applying said locking mechanism.

4. A propeller including adjustable blades, means for proportioning the pitch of said blades with respect to the speed of rotation of said propeller, locking mechanism adapted to be motivated by the rotation of said propeller for releasably holding said blades against decreasing from a predetermined pitch during rotation of said propeller below a predetermined speed, control apparatus for applying said locking mechanism, and means operable independently of said control apparatus for releasing said locking mechanism when the pitch of said blades is increased above said predetermined pitch by operation of the propeller above said predetermined speed.

5. In an aircraft having a propeller including adjustable blades and having an associated stationary structure, means for proportioning the pitch of said blades with respect to the speed of rotation of said propeller, a locking member movably mounted on said propeller for holding said blades at a predetermined pitch, manual control apparatus having a brake element mounted on said stationary structure normally free from engagement with said propeller and adapted to coact frictionally with said locking mechanism for moving the latter to an operative position, and means associated with said locking mechanism and operable by rotation of said propeller for releasing the same.

6. In an aircraft including a propeller having adjustable blades and an engine for driving said propeller, blade regulating means for proportioning the pitch of said blades with respect to the speed of rotation of said propeller so as to maintain a predetermined power output speed of operation of said engine during various rates of forward movement of said aircraft, locking mechanism for selectively holding said blades at a predetermined pitch including a member movably mounted on said propeller and adapted to be placed in an operative position by rotation of said propeller relative thereto, and manual control apparatus engageable with said member for momentarily holding the latter against rotation in unison with said propeller so as to apply said locking mechanism.

7. In an aircraft including a propeller having adjustable blades and an engine for driving said propeller, means for proportioning the pitch of said blades with respect to the speed of rotation of said propeller so as to maintain full rated power and full speed operation of said engine during various rates of forward movement of said aircraft, locking mechanism for selectively holding said blades at a predetermined pitch including a member movably mounted on said propeller and adapted to be placed in an operative position by movement of said propeller relative thereto, means for holding said member against movement to an operative position during operation of said propeller below said predetermined speed, and control apparatus adapted to momentarily hold said member against movement in unison with said propeller during operation thereof slightly above said predetermined speed so as to apply said locking mechanism.

8. A propeller including a hub portion having a shaft receiving structure and rotatable propeller blades, a synchronizing member shiftably mounted on said shaft receiving structure, a pair of cranks, one journaled on each side of said hub portion and connected with one of said blades respectively, resilient bearing means between said synchronizing member and said hub portion normally urging said blades toward low pitch positions, weighted members carried by said cranks for turning the latter against the action of said springs to increase the pitch of said blades in proportion to the speed of rotation of said propeller above a predetermined speed, and locking mechanism engageable with said compensating member when the latter is in only one predetermined position for holding the pitch of said blades against decreasing from an advanced pitch position at a predetermined value during varying speeds of rotation of said propeller.

9. A propeller including rotatably adjustable blades, blade governing mechanism responsive to rotation of said propeller for proportioning the pitch of said blades with respect to the speed of said propeller including a shiftable synchronizing member having protruding elements, a brake drum rotatably mounted on said propeller having apertures therein for receiving said protruding elements, means normally retaining the apertures of said brake drum in registration with said protruding elements, and a brake shoe for retarding rotation of said drum and placing the apertures thereof out of registration with said protruding elements so as to lock said blade governing mechanism in a predetermined pitch producing position.

10. A propeller including rotatably adjustable blades, blade governing mechanism responsive to rotation of said propeller for proportioning the pitch of said blades with respect to the speed of said propeller including a shiftable synchronizing member having protruding elements, a brake drum rotatably mounted on said propeller having apertures therein for receiving said protruding elements, a member coacting between said propeller and brake drum normally retaining the apertures of the latter in registration with said protruding elements, and selective means for momentarily retarding rotation of said drum whereby to move said apertures out of alignment with said elements during temporary disengagement of said elements and said drum.

11. In an aircraft including an engine having a propeller shaft, a propeller having a hub fixed on said shaft and including rotatably adjustable blades, a synchronizing member shiftably mounted on said hub, means pivotally connecting the blades of said propeller with said synchronizing member, springs urging said synchronizing member in one direction for holding said blades in their minimum pitch positions, and centrifugal arms secured to said pivotal connecting means for increasing the pitch of said blades against the action of said springs, said springs having an initial compression of sufficient amplitude to hold said blades against turning from their minimum pitch positions until the rated full power speed of said engine is approached.

12. In an aircraft including an engine having a propeller shaft, a propeller having a hub fixed on said shaft and including rotatably adjustable blades, blade governing apparatus on said hub having resilient means calibrated for holding said blades at their minimum pitch positions during rotation of said propeller at speeds below the normal rated speed of said engine and including centrifugal operable members adapted to rapidly increase the pitch of said blades to their maximum pitch positions when said propeller is rotated slightly faster than the rated speed of said engine, and manually controllable mechanism for releasably holding said blades against decreasing from a predetermined pitch position irrespective of the speed of rotation of said propeller having a member for opposing said resilient means and adapted to be held by the latter in an operative position.

13. A propeller including adjustable blades, means responsive to rotation of said propeller for varying the pitch of said blades, control apparatus supported independently of said propeller, and locking mechanism contained solely by said propeller adapted to be placed in an operative position by momentary actuation of said control apparatus and to releasably hold said blades against decreasing from a predetermined pitch after actuation of said control apparatus is discontinued.

14. A propeller including adjustable blades, means responsive to rotation of said propeller for varying the pitch of said blades, a positive locking member movably mounted on said propeller for releasably holding said blades at a predetermined pitch, means responsive to rotation of said propeller for releasably holding said locking member in an inoperative position, and manual control apparatus engageable with said locking member for causing movement of the latter relative to said propeller to an operative position.

15. A propeller including adjustable blades, means for varying the pitch of said blades, a positive locking member journaled on said propeller for releasably holding said blades at a predetermined pitch, means responsive to rotation of said propeller for releasably holding said locking member in an inoperative position, and control apparatus including a friction element engageable with said locking member for causing rotation of said propeller relative thereto so as to bring said locking member into an operative position.

16. In an aircraft having a propeller including adjustable blades and having an associated stationary structure, means for proportioning the pitch of said blades with respect to the speed of rotation of said propeller, manual control apparatus mounted on said stationary structure normally free from engagement with said propeller and releasable locking mechanism mounted on said propeller normally free from locking engagement therewith and adapted to be applied by momentary actuation of said control apparatus and to remain in an applied position thereafter.

17. A propeller including adjustable blades, means responsive to rotation of said propeller for varying the pitch of said blades having a resilient member normally urging said blades toward minimum pitch positions, locking mechanism for holding said blades against decreasing from a predetermined pitch having a member for opposing said resilient means and adapted to be held in an operative position by the action of the latter, and control apparatus for bringing said member into opposing relation with respect to said resilient means.

18. A propeller including adjustable blades, blade regulating means for proportioning the pitch of said blades with respect to the speed of rotation of said propeller having a compression spring normally urging said blades toward decreased pitch positions and a locking member movably mounted on said propeller and engageable with said blade regulating means for opposing said spring and releasably holding said blades against decreasing from a predetermined pitch, said locking member being releasably securable in an operative position by the compression of said spring.

19. A propeller including adjustable blades, blade regulating means for proportioning the pitch of said blades with respect to the speed of rotation of said propeller having a compression spring normally urging said blades toward decreased pitch positions, a locking mechanism movably mounted on said propeller and engageable with said blade regulating means for opposing said spring and releasably holding said blades against decreasing from a predetermined pitch, said locking mechanism being releasably securable in an operative position by the compression of said spring and means responsive to rotation of said propeller for moving said locking mechanism to an inoperative position when the compression of said spring is released.

20. A propeller including adjustable blades, means responsive to rotation of said propeller for varying the pitch of said blades, locking mechanism for releasably holding said blades against decreasing from a predetermined pitch position, manually operable control means for applying said locking mechanism, and a member responsive to rotation of said propeller above said predetermined speed for moving said locking mechanism to an inoperative position.

JOHN SQUIRES.